United States Patent
Rodriguez et al.

(10) Patent No.: US 12,546,710 B2
(45) Date of Patent: Feb. 10, 2026

(54) DETECTION OF A PERSONAL CARE COMPOSITION BASED ON INFRARED RADIATION

(71) Applicant: Edgewell Personal Care Brands, LLC, Chesterfield, MO (US)

(72) Inventors: Edgar Rodriguez, Potomac, MD (US); Michael Russell, Madison, NJ (US)

(73) Assignee: Edgewell Personal Care Brands, LLC, Chesterfield, MO (US)

(*) Notice: Subject to any disclaimer, the term of this patent is extended or adjusted under 35 U.S.C. 154(b) by 191 days.

(21) Appl. No.: 18/701,351

(22) PCT Filed: Sep. 13, 2022

(86) PCT No.: PCT/US2022/076329
§ 371 (c)(1),
(2) Date: Apr. 15, 2024

(87) PCT Pub. No.: WO2023/069807
PCT Pub. Date: Apr. 27, 2023

(65) Prior Publication Data
US 2025/0258090 A1    Aug. 14, 2025

Related U.S. Application Data

(60) Provisional application No. 63/256,774, filed on Oct. 18, 2021.

(51) Int. Cl.
*G01N 21/35* (2014.01)
*G06Q 30/0601* (2023.01)
(Continued)

(52) U.S. Cl.
CPC .......... *G01N 21/35* (2013.01); *G06Q 30/0627* (2013.01); *G06Q 30/0631* (2013.01);
(Continued)

(58) Field of Classification Search
None
See application file for complete search history.

(56) References Cited

U.S. PATENT DOCUMENTS 9,851,298 B1   12/2017   Isikman et al.
9,877,900 B2    1/2018   Doucet et al.
(Continued)

FOREIGN PATENT DOCUMENTS

JP        08233733 A  *  9/1996
JP     2021032855 A  *  3/2021
(Continued)

OTHER PUBLICATIONS

International Search Report and Written Opinion of the International Searching Authority mailed on Jan. 4, 2023 in International Application PCT/US2022/076329.
(Continued)

*Primary Examiner* — Marcus H Taningco
(74) *Attorney, Agent, or Firm* — Edgar Rodriguez

(57) ABSTRACT

Embodiments relate to a system, a computing device, a computer readable storage medium, and a method to detect a personal care composition. In embodiments, an image capture device may capture values for infrared (IR) radiation from an interaction between light and an ingredient of the personal care composition. In embodiments, a processor may detect the presence of the personal care composition based on the valued for the IR radiation captured by the image capture device. Embodiments further relate to a personal care composition including one or more ingredients to be used as a marker for the personal care composition, selected for an ability to exhibit diffuse reflection or absorbance of IR radiation.

20 Claims, 3 Drawing Sheets

(51) Int. Cl.
  *G06V 10/25* (2022.01)
  *G06V 10/60* (2022.01)
  *G06V 40/10* (2022.01)

(52) U.S. Cl.
  CPC .............. *G06V 10/25* (2022.01); *G06V 10/60* (2022.01); *G06V 40/10* (2022.01); *G06V 2201/10* (2022.01)

(56) References Cited

U.S. PATENT DOCUMENTS

| | | |
|---|---|---|
| 10,146,375 B2 | 12/2018 | Shahar et al. |
| 10,354,387 B2 | 7/2019 | Lee et al. |
| 2006/0149151 A1* | 7/2006 | Ladjevardi ................ G01J 3/50 600/475 |
| 2018/0202927 A1 | 7/2018 | Isikman et al. |
| 2019/0282100 A1 | 9/2019 | Millikan |
| 2021/0000704 A1 | 1/2021 | Shao et al. |

FOREIGN PATENT DOCUMENTS

| | | |
|---|---|---|
| KR | 2095683 B1 * | 3/2020 |
| KR | 10-2021-0028573 A | 3/2021 |
| WO | WO-2017034102 A1 * | 3/2017 ........... G01N 21/359 |

OTHER PUBLICATIONS

International Preliminary Report on Patentability issued by the International Bureau of WIPO on Apr. 23, 2024 in International Application PCT/US2022/076329.

* cited by examiner

DETECTION OF A PERSONAL CARE COMPOSITION BASED ON INFRARED RADIATION

CROSS-REFERENCE TO RELATED APPLICATIONS

This application claims priority to International Application No PCT/US2022/076329 filed on Sep. 13, 2022, which claims priority to-U.S. Provisional Patent Application No. 63/256,774, filed Oct. 18, 2021, the contents of which are incorporated herein by reference in their entirety.

TECHNICAL FIELD

Embodiments relate to the detection of a personal care composition based on an interaction between infrared radiation and an ingredient of the personal care composition.

BACKGROUND

Special purpose hardware is available to evaluate sunscreen compositions. For example, external adapters may be coupled with a smartphone to evaluate the effectiveness of a sunscreen composition against ultraviolet (UV) radiation. Benchtop equipment may also be used to evaluate the effectiveness of compositions against infrared (IR) radiation using skin color data, hydration data, and mathematical integration of IR data. Meanwhile, IR detectors may be used in computer vision and imaging processing for the recognition of semantic objects (object recognition) such as humans, buildings, automobiles, and the like. IR detectors may also be used to detect a body region together with UV detectors that are used to evaluate the effectiveness of a sunscreen composition against UV radiation (e.g., high IR values to indicate a body region and low UV values to indicate absorbance). There is, however, considerable room for improvement to detect a personal care composition without using external hardware adapters, fixed benchtop equipment, and/or object recognition processes and aspects thereof such as filtering, visible light processing, and so on.

SUMMARY

Embodiments relate to a system comprising an image capture device to capture values for infrared (IR) radiation from an interaction between light and an ingredient of a personal care composition, and a processor including detector logic to detect the presence of the personal care composition based on the values for the IR radiation. The values for IR radiation may be, for example, values for reflected IR radiation (e.g., scattered IR radiation, scattered IR pattern, etc.), values for absorbed IR radiation (e.g., absorbed IR pattern, etc.), normalized values (e.g., normalized intensity, etc.), or combinations thereof. For example, the image capture device may include an emitter to emit IR radiation that is converted to values for reflected IR radiation, absorbed IR radiation, normalized IR intensity, or combinations thereof.

The detector logic may establish the presence of the personal care composition based on pixel values, voxel values, and/or normalized values corresponding to the IR radiation (e.g., reflected IR radiation, etc.). Additionally or alternatively, the processor may include identifier logic to identify the personal care composition. The identifier logic may access a data storage device, or otherwise determine in real-time, values for reference IR radiation, product metadata, sensor data, user preference data, tracked use data, historical data, application use data, user prompt data, context data, or combinations thereof.

In any of the preceding embodiments, the processor may include reference logic to capture values for reference IR radiation. The reference logic may map the values for the reference IR radiation to specific ingredients, combinations of ingredients, types of ingredients, combinations of types of ingredients, concentrations of ingredients, ingredient functionality, formulation functionality, formulation formats, specific products, other information, or combinations thereof. The reference logic may determine other information such as product metadata, sensor data, user preference data, user prompt data, context data, or combinations thereof. The product metadata may include an identification of an active ingredient, an inactive ingredient, a brand, a product name, a marketing claim, a product identifier, a trademark, ingredient functionality, formulation functionality, or combinations thereof. The product metadata may be determined by an identifier (e.g., RFID, barcode, etc.), by an object recognition processes, from publicly available information, from non-public information, or combinations thereof. The publicly available information may include information from a web page, a product label, a packaging component, or combinations thereof. The non-public information may include information from a formulation listing having an exact ingredient used, an exact concentration of the exact ingredient used, an exact formulation format of the personal care composition, an exact functionality of the exact ingredient used, a formulation functionality, or combinations thereof.

In any of the preceding embodiments, the processor may include feedback logic to provide output to a user based on a detection of the personal care composition. The output may be further based on an identification of the personal care composition, product metadata, sensor data, user preference data, tracked use data, historical data, application use data, user prompt data, context data, or combinations thereof. The output may include a visual message to a user, an audio message to the user, a tactile message to the user, or combinations thereof. Thus, the output may include a message corresponding to a determination of whether a sufficient or desired coverage is achieved for the personal care composition, an identification of the personal care composition, guidance for application or reapplication of the personal care composition, replenishment services, product recommendations, or combinations thereof. The feedback logic may determine a region of interest in a scene captured by the image capture device to implement one of more aspects of embodiments such as detection, identification, reference, and/or feedback processes.

In any of the preceding embodiments, the image capture device may be physically located on a same computing device with the processor. The computing device may include a mobile device, a wearable device, a smart device, or combinations thereof. Additionally or alternatively, the personal care composition may include an ingredient selected based on an ability to exhibit diffuse reflection or absorption independent of formulation functionality. The ingredient may include a metal particle, a synthetic particle, a mineral particle, or combinations thereof. The ingredient may include a metal, a peptide, or combinations thereof. The personal care composition may include an active agent such as, e.g., a sunscreen filter (e.g., organic sunscreen filter, etc.), an antioxidant (e.g., polyphenol, etc.), a skin care agent (e.g., anti-wrinkle, anti-microbial, etc.), an insect repellent (e.g., DEET, oils, etc.), etc.

Embodiments further relate to at least one computer readable storage medium comprising a set of instructions, which when executed by a processor, cause the processor to capture values for IR radiation from an interaction between light and an ingredient of a personal care composition, and detect the presence of the personal care composition based on the values for the IR radiation. For example, the instructions, when executed, may cause the processor to emit IR radiation that is to be converted to the values for the IR radiation.

The instructions, when executed, may cause the processor to establish the presence of the personal care composition based on pixel values, voxel values, and/or normalized values corresponding to the IR radiation. Additionally or alternatively, the instructions, when executed, may cause the processor to identify the personal care composition. The instructions, when executed, may cause the processor to access a data storage device, or otherwise determine in real-time, values for reference IR radiation, product metadata, sensor data, user preference data, tracked use data, historical data, application use data, user prompt data, context data, or combinations thereof.

In any of the preceding embodiments, the instructions, when executed, may cause the processor to capture values for reference IR radiation. The instructions, when executed, may cause the processor to map the values for the reference IR radiation to specific ingredients, combinations of ingredients, types of ingredients, combinations of types of ingredients, concentrations of ingredients, ingredient functionality, formulation functionality, formulation formats, specific products, other information, or combinations thereof. The instructions, when executed, may cause the processor to determine other information such as product metadata, sensor data, user preference data, user prompt data, context data, etc., or combinations thereof. The product metadata may include an identification of an active ingredient, an inactive ingredient, a brand, a product name, a marketing claim, a product identifier, a trademark, ingredient functionality, formulation functionality, or combinations thereof. The product metadata may be determined by an identifier (e.g., RFID, barcode, etc.), by implementing object recognition processes, from publicly available information, from non-public information, or combinations thereof.

In any of the preceding embodiments, the instructions, when executed, may cause the processor to provide output to a user based on a detection of the personal care composition. The instructions, when executed, may cause the processor to provide output to a user further based on an identification of the personal care composition, product metadata, sensor data, user preference data, tracked use data, historical data, application use data, user prompt data, context data, or combinations thereof. The instructions, when executed, may cause the processor to provide output including a visual message to a user, an audio message to the user, a tactile message to the user, or combinations thereof. The instructions, when executed, may cause the processor to provide output including a message corresponding to a determination of whether a sufficient or desired coverage is achieved for the personal care composition, an identification of the personal care composition, guidance for application or reapplication of the personal care composition, replenishment services, product recommendations, or combinations thereof. The instructions, when executed, may cause the processor to determine a region of interest in a scene captured by the image capture device to implement one of more aspects of embodiments.

Embodiments further relate to a method comprising capturing values for IR radiation from an interaction between light and an ingredient of a personal care composition, and detecting the presence of the personal care composition based on the values for the IR radiation. The method may include emitting IR radiation to be converted to the values for the IR radiation.

The method may include establishing the presence of the personal care composition based on pixel values, voxel values, and/or normalized values corresponding to the IR radiation. Additionally or alternatively, the method may include identifying the personal care composition. Identifying the personal care composition may include accessing a data storage device, or otherwise determining in real-time, values for reference IR radiation, product metadata, sensor data, user preference data, tracked use data, historical data, application use data, user prompt data, context data, or combinations thereof.

In any of the preceding embodiments, the method may include capturing values for reference IR radiation. The method may include mapping the values for the reference IR radiation to specific ingredients, combinations of ingredients, types of ingredients, combinations of types of ingredients, concentrations of ingredients, ingredient functionality, formulation functionality, formulation formats, specific products, other information, or combinations thereof. The method may include determining other information such as product metadata, sensor data, user preference data, user prompt data, context data, etc., or combinations thereof. The product metadata may include an identification of an active ingredient, an inactive ingredient, a brand, a product name, a marketing claim, a product identifier, a trademark, ingredient functionality, formulation functionality, or combinations thereof. The method may include determining the product metadata by using an identifier (e.g., RFID, barcode, etc.), by implementing object recognition processes, from publicly available information, from non-public information, or combinations thereof.

In any of the preceding embodiments, the method may include providing output to a user based on a detection of the personal care composition. The method may include providing output to a user further based on an identification of the personal care composition, product metadata, sensor data, user preference data, tracked use data, historical data, application use data, user prompt data, context data, etc., or combinations thereof. The method may include providing output including a visual message to a user, an audio message to the user, a tactile message to the user, or combinations thereof. The method may include providing output including a message corresponding to a determination of whether a sufficient or desired coverage is achieved for the personal care composition, an identification of the personal care composition, guidance for application or reapplication of the personal care composition, replenishment services, product recommendations, or combinations thereof. The method may include determining a region of interest in a scene captured by the image capture device to implement one of more aspects of embodiments.

In any of the preceding embodiments, the method may include selecting an ingredient based on an ability to exhibit diffuse reflection or absorption independent of formulation functionality. The method may include selecting an ingredient including a metal particle, a synthetic particle, a mineral particle, or combinations thereof. The method may include selected an ingredient including a metal, a peptide, or combinations thereof. The method may include adding an active agent to the personal care composition such as, e.g., a sunscreen filter (e.g., organic sunscreen filter, etc.), an antioxidant (e.g., polyphenol, etc.), a skin care agent (e.g., anti-wrinkle, anti-microbial, anti-acne, moisture, etc.), a repellant (e.g., DEET, oils, etc.), or combinations thereof.

Embodiments further relate to a personal care composition including ingredient(s) that exhibit diffuse reflection or absorption. The ingredient(s) may be present as a marker for a personal care composition. The ingredient(s) may be added independent of functionality (e.g., ingredient, formulation, etc.). The ingredient(s) may be added in effective amounts to provide no, minimal, or sub-optimal functionality. The ingredient(s) may be present in a personal care composition that traditionally does not have the ingredient. The ingredient(s) may include a metal particle, a synthetic particle, a mineral particle, or combinations thereof.

BRIEF DESCRIPTION OF THE DRAWINGS

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION

Embodiments can comprise, consist of, and consist essentially of the features and/or steps described herein, as well as any of the additional or optional ingredients, components, steps, or features described herein or would otherwise be appreciated by one of skill in the art. It is to be understood that all concentrations disclosed herein are by weight percent (wt. %.) based on a total weight of the composition unless otherwise indicated. Where appropriate, the International Nomenclature of Cosmetic Ingredients (INCI) name of ingredients/components is provided. In this regard, the term "(and)" is an INCI designation for a mixture of listed components separated by the term. Any numerical range recited herein is intended to include all sub-ranges subsumed therein, and such ranges are understood to include each and every number and/or fraction between the stated range lower and upper values. Moreover, the term "about" and the like may refer to deviations of +20%.

Figure 1:
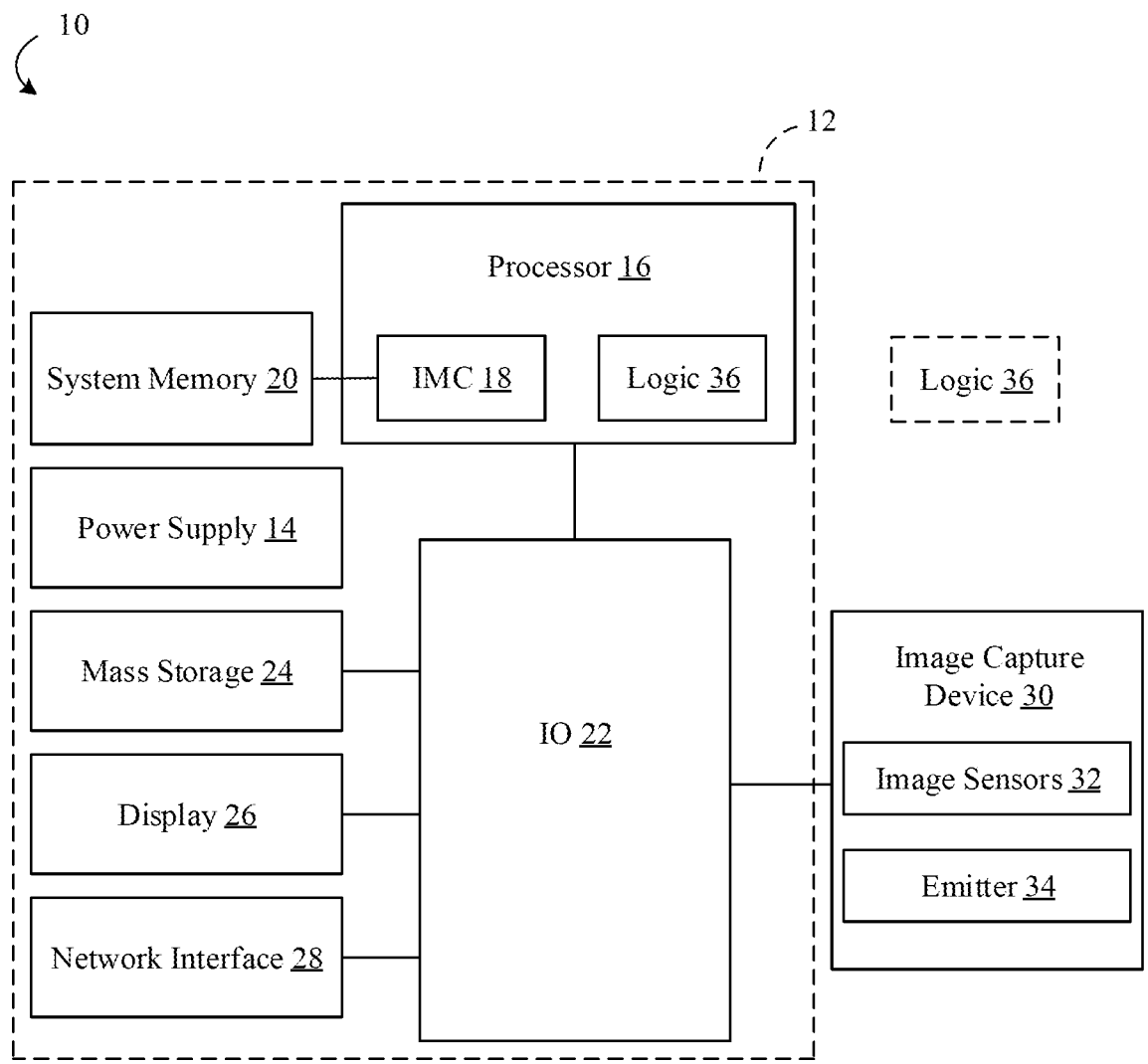
FIG. 1 is an illustration of an example of a system to detect a personal care composition based on values for infrared (IR) radiation from an interaction between light and one or more ingredients of the personal care composition according to an embodiment.

FIG. 1 shows a system 10 configured to detect a personal care composition based on values for infrared (IR) radiation from an interaction between light and one or more ingredients of the personal care composition. Personal care compositions may be located on a keratinous or hirsute substance, or may be located on a test substance such as a polymer test plate (e.g., PMMA, etc.) for screening or other testing purposes related to formulation functionality. Personal care compositions may include any formulation format such as, without limitation, an emulsion (O/W, W/O, O/O, O/S, multiple emulsion, etc.), a gel, a lotion, a cream, a spray, a mist, a stick, a mouse, a foam, an ointment, a milk, a base, a concentrate, a powder, or combinations thereof. For example, a substantially anhydrous base may be used in an aqueous emulsion to form a lotion or a cream that is applied to skin. Similarly, ingredients and use levels to make such formats may be readily adjusted and mixed in a single phase or in multiple phases to provide a desired commercial personal care product. Thus, ingredients of personal care compositions may be readily included, omitted, adjusted, or mixed in a single phase or in multiple phases to provide a commercial personal care product that accounts for cost, aesthetics, and/or product performance objectives.

Moreover, personal care compositions can be filled into any number of bottles, tottles, tubes, etc., having a variety of closing structures, pumps, sprays (e.g., mists, aerosols, bag on valve), amongst others, or combinations thereof. A bag-on-valve system may, for example, be used to deliver a personal care composition using compressed gas such as air, nitrogen, or carbon dioxide. In addition, personal care compositions may be formulated as a concentrate which, when combined with a propellant, forms a continuous aerosol spray commercial product. Propellants may include, for example, isobutene, butane, propane, dimethyl ether, methyl ether, tetraflouroethane, 1,1-difluoroethane, or combinations thereof. Propellants generally exist as equilibrium of vapor and liquid and can be either dissolved in or miscible with the composition. Ratios of propellant to the concentrate can be adjusted to account for cost, aesthetics, and product performance objectives. Thus, the concentrate and the propellant may be added to an aerosol container in a ratio of about 90:10 to about 60:40, for example about 75:25, about 70:30, and so on. The aerosol propellant may, for example, be present in an amount of about 10 wt. % to about 60 wt. %, based on a total weight of the personal care composition (e.g., final composition).

Personal care compositions may include ingredients such as, without limitation, carriers, sunscreen filters, film formers, surfactants, anti-aging actives, insect repellants, amino acids, colorants, pigments, dyes, opacifiers, pH adjusters, fragrances, fillers, preservatives, preservative boosters, chelating agents, stabilizers, sphingolipids, minerals, keratolytics, hormonal compounds, analgesics, anti-allergenic agents, H1 or H2 antihistamines, anti-inflammatory agents, anti-irritants, anti-neoplastics, immune system boosting agents, immune system suppressing agents, anti-acne agents, anesthetics, antiseptics, skin cooling compounds, skin pollution protectants, skin penetration enhancers, exfoliants, staining agents, depigmenting agents, hypopigmenting agents, stabilizers, extracts (fruit, flower, plant, vegetable), vitamins (e.g., A, C, E, derivatives thereof), antioxidants, alpha and beta hydroxy acids, retinol and its derivatives, propellants, or combinations thereof.

Accordingly, for example, personal care compositions may be composed of one or more carriers including, without limitation, water, vegetable oils, esters (e.g., octyl palmitate, isopropyl myristate, isopropyl palmitate, etc.), ethers (e.g., dicapryl ether, dimethyl isosorbide, etc.), $C_2$-$C_4$ alcohol (e.g., ethanol, isopropanol, etc.), fatty alcohols (e.g., cetyl alcohol, stearyl alcohol, behenyl alcohol, etc.), isoparaffins (e.g., isooctane, isododecane, isohexadecane, etc.), silicone oils (e.g., dimethicones, polysiloxanes, etc.), hydrocarbon oils (e.g., mineral oil, petrolatum, isoeicosane polyisobutene, etc.), polyols (e.g., propylene glycol, glycerin, butylene glycol, pentylene glycol, hexylene glycol, etc.), natural-based micelles (e.g., oleosomes), or combinations thereof.

For example, personal care compositions may be composed of one or more carriers that act as skin-conditioning agents (e.g., emollients, humectants, etc.) for moisturization. Examples of useful skin-conditioning agents include, without limitation, esters (e.g., isopropyl myristate, isopropyl palmitate, 1-decene polymer (hydrogenated), esters of benzoic acid such as lauryl/myristyl benzoate, $C_{12}$-$C_{15}$ alkyl benzoate, $C_{16}$-$C_{17}$ alkyl benzoate, stearyl benzoate, isostearyl benzoate, behenyl benzoate, ethylhexyl benzoate, butyloctyl benzoate, hexyldecyl benzoate, octyldodecyl benzoate, etc.), polyols (e.g., glycerin, butylene glycol, hexylene glycol, 2,3-butanediol, 1,2-alkane diols such propylene glycol, 1,2-butanediol, pentylene glycol, ethyl hexanediol, caprylyl glycol, decylene glycol, etc.), natural oils (e.g., nut oil, seed oil, fruit oil, etc.), fatty acids (e.g., lanolin, petrolatum, mineral oil, etc.), triglycerides (caprylic/capric triglyceride, etc.), silicones (cyclomethicone, dimethicone, etc.), salicylates (e.g., butyloctyl salicylate, $C_{12}$-$C_{15}$ alkyl salicylate, capryloyl salicylic acid, hexydodecyl salicylate, isocetyl salicylate, isodecyl salicylate, tridecyl salicylate, etc.), or combinations. One or more carriers may also be structured with an amphiphile monolayer to at least partly encapsulate an active agent. For example, oleosomes (oil bodies) such as *Carthamus tinctorous* oleosomes and *Prunus amygdalus dulcis* oleosomes are types of micelles derived from plant tissues including seeds, roots, and leaves of plants (although oleosomes may be most abundant from seeds and nuts) that may encapsulate more than 90%, preferably more than 99%, of a total amount of active ingredient present in the personal care composition.

Water may also be intentionally added in personal care compositions at an amount greater than 15.0 wt. % such as, for example, 25.0 wt. %, 45.0 wt. %, 55.0 wt. %, 65.0 wt. %, 75.0 wt. %, including every number and/or fraction therebetween, based on the total weight of a hydrous personal care composition. For example, a water-in-oil (W/O) emulsion may have an aqueous dispersed phase stabilized by an emulsifier and disposed in a hydrophobic continuous phase. Water may, however, be intentionally added in an amount of 15.0 wt. % or less, based on a total weight of the personal care composition, to form substantially anhydrous personal care compositions. Moreover, one or more ingredients may have associated with it absorbed and/or adsorbed water that can be carried into the otherwise substantially anhydrous personal care compositions. For economic, sourcing, and/or formulation reasons, it may be disadvantageous to process hygroscopic materials to make them completely free of water. Thus, substantially anhydrous personal care compositions may include 15.0 wt. % or less, preferably 10.0 wt. % or less and more preferably 5.0 wt. % or less (e.g., ≤1.0 wt. %), of water based on a total weight of the personal care composition.

Carriers may be present from about 0.1 wt. % to about 99.0 wt. %, based on the total weight of the personal care composition. A carrier may, for example, be present in an amount of 0.008 wt. %, 0.1 wt. %, 1.0 wt. %, 5.0 wt. %, 10.0 wt. %, 15.0 wt. %, 18.0 wt. %, 20.0 wt. %, 40.0 wt. %, 60.0 wt. %, 90.0 wt. %, 99.0 wt. %, including every number and/or fraction therebetween, based on the total weight of the personal care composition.

Meanwhile, sunscreen filters are capable of substantially absorbing, scattering, and/or deflecting UV radiation on a keratinous substrate. Preferably, the sun protection factor (SPF) of a sunscreen composition is ≥8 and the UVA protection factor (UVAPF) is at least ⅓ the SPF. Thus, for example, physical or mineral sunscreen filters include metal oxides (e.g., titanium dioxide, zinc oxide, combinations thereof, etc.) that may be used in effective amounts to provide an SPF of 8 or more (in contrast to other uses as colorants, etc.). Such filters may have various morphologies such as crystalline form (e.g., rutile, etc.), size (e.g., 5 nm-1.0 μm, etc.), shape (e.g., amorphous, spherical, etc.), and/or functionalization (e.g., coatings, etc.) that allow for the effective use as sunscreen filters. For example, titanium dioxide may have a coating of silicone copolymers, fatty acids, salts of fatty acids, oxides of silicon, oxides of aluminum, oxides of zirconium, or combinations thereof.

Organic sunscreen filters may be selected from a p-aminobenzoic acid, a benzophenone, a camphor, a cinnamate, a dibenzoylmethane, a salicylate, an imidazole, a triazole, a triazine, a triazole, or combinations thereof. Organic sunscreen filters may include one or more of: p-aminobenzoic acids such as p-aminobenzoic acid (CAS #: 150-13-0), p-aminobenzoic acid, monoglyceryl ester (CAS #: 136-44-7), p-aminobenzoic acid, octyl dimethyl ester (padimate-0, CAS #: 21245-02-3), p-aminobenzoic acid, ethyl dihydroxypropyl (roxadimate, CAS #: 58882-17-0), p-aminobenzoic acid, 2,4-dihydroxy-N-(3-hydroxypropyl)-3,3-dimethylbutanamide ester, p-aminobenzoic acid, PEG-25 (CAS #: 116242-27-4); anthranilates such as menthyl anthranilate (CAS #: 134-09-8); benzophenones such as benzophenone (CAS #: 119-61-9), 2,4-dihydroxybenzophenone (benzophenone-1, CAS #: 131-56-6), 2,21,4,4'-tetrahydroxybenzophenone (benzophenone-2, CAS #: 131-55-5), 2-hydroxy-4-methoxybenzophenone (benzophenone-3, oxybenzone, CAS #: 131-57-7), 2-hydroxy-4-methoxybenzophenone-5-sulfonic acid (benzophenone-4, sulisobenzone, CAS #: 4065-45-6), 2-hydroxy-4-methoxybenzophenone-5-sulfonic acid, monosodium salt (benzophenone-5, CAS #: 6628-37-1), 2,2'-dihydroxy-4,4'-dimethoxybenzophenone (benzophenone-6, CAS #: 131-54-4), 5-chloro-2-hydroxybenzophenone (benzophenone-7, CAS #: 85-19-8), 2,2'-dihydroxy-4-methoxybenzophenone (benzophenone-8, dioxybenzone, CAS #: 131-53-3), 2,2'-dihydroxy-4,4'-dimethoxybenzophenone-5,5'-disulfonic acid sodium salt (benzophenone-9, CAS #: 76656-36-5), 2-hydroxy-4-methoxy-4'-methyl-benzophenone (benzophenone-10, Mexenone, CAS #: 1641-17-4), bis(2,4-ihydroxyphenyl) methanone (benzophenone-11, CAS #: 1341-54-4), 2-hydroxy-4-(octyloxy)benzophenone (benzophenone-12, octabenzone, CAS #: 1843-05-6), 2,21-dihydroxy-4-methoxybenzophenone (dioxybenzone, CAS #: 131-53-3), 2-hydroxy-4-methoxybenzophenone (oxybenzone, CAS #: 131-57-7), 2-hydroxy-4-methoxybenzophenone-5-sulphonic acid (sulisobenzone, CAS #: 4065-45-6), hexyl 2-(4-(diethylamino)-2-hydroxybenzoyl)benzoate (CAS #: 302776-68-7); camphors such as benzylidene camphor sulfonic acid (CAS #: 56039-58-8), 3-benzylidene camphor (CAS #: 15087-24-8), polyacrylamidomethyl benzylidene camphor (CAS #: 113783-61-2), terephthalylidene dicamphor sulfonic acid (CAS #: 90457-82-2), 3-(4-methylbenzyliden) camphor (CAS #: 36861-47-9), camphor benzalkonium methosulfate (CAS #: 52793-97-2), bornelone (CAS #: 2226 Nov. 1); cinnamates such as ethyl cinnamate (CAS #: 103-36-6), 2-ethoxyethyl-p-methoxycinnamate (cinoxate, CAS #: 104-28-9), isoamyl p-methoxycinnamate (CAS #: 71617-10-2), diisopropyl methyl cinnamate (CAS #: 32580-71-5), 2-ethylhexyl alpha-cyano-beta-phenylcinnamate (octocrylene, CAS #: 6197-30-4), diethanolamine methoxycinnamate (CAS #: 56265-46-4), isopropyl methoxycinnamate (CAS #: 5466-76-2), isoamyl p-methoxycinnamate (CAS #: 71617-10-2), glyceryl octanoate dimethoxycinnamate, ethyl diisopropylcinnamate (CAS #: 32580-72-6), ethyl methoxycinnamate (CAS #: 99880-64-5), octyl methoxycinnamate (octinoxate, CAS #: 5466-77-3); dibenzoylmethanes such as dibenzoylmethane (CAS #: 120-46-7), isopropyl dibenzoylmethane (eusolex, CAS #: 63250-25-9), 4-tert-Butyl-4'-methoxy-dibenzoyl-methane (avobenzone, CAS #: 70356-09-1); salicylates such as 3,3,5-trimethylcyclohexyl salicylate (homosalate, CAS #: 118-56-9), benzyl salicylate (CAS #: 118-58-1), octyl salicylate (octisalate, CAS #: 118-60-5), 2-hydroxyethyl salicylate (CAS #: 87-28-5), menthyl salicylate (CAS #: 89-46-3), isopropylbenzyl salicylate (CAS #: 94134-93-7); imidazoles such as phenylbenzimidazole, phenylbenzimidazol-5-sulfonic acid (CAS #: 27503-81-7), phenylbenzimidazole tea sulfonate (CAS #: 73705-00-7), urocanic acid [4-imidazoleacrylic acid, CAS #: 104-98-3], ethyl urocanate (CAS #: 27538-35-8), bisymidazylate (CAS #: 180898-37-7), sodium phenylbenzimidazole sulfonate (CAS #: 5997-53-5); triazines such as bis(ethylhexyloxyphenol methoxyphenol) triazine (bemotrizinol, CAS #: 187393-00-6); triazoles such as 2-(2-hydroxy-5-methyl-phenyl)benzotriazole (drometrizole, CAS #: 2440-22-4); triazones such as bis-ethylhexyloxyphenol methoxyphenyl triazine (iscotrizinol, CAS #: 154702-15-5), ethylhexyl triazone (CAS #: 88122-99-0); petrolatum (CAS #: 8009-03-8), acrylates such as diurethane dimethacrylate (CAS #: 103597-45-1), ethyl 2-cyano-3,3-diphenylacrylate (etocrilene, CAS #: 5232-99-5); siloxanes such as drometrizole trisiloxane (CAS #: 155633-54-8).

A sunscreen filter may, for example, be present in an amount of about 1.0 wt. % to 40.0 wt. %, based on the total weight of the sunscreen composition. For example, one or more sunscreen filters may be present in an amount of 0.8 wt. %, 1.0 wt. %, 5.0 wt. %, 10.0 wt. %, 15.0 wt. %, 20.0 wt. %, 30.0 wt. %, 41.0 wt. %, including every number and/or fraction therebetween, based on the total weight of the sunscreen composition.

Antioxidants may also be added to counter free radicals that damage biomolecules. Antioxidants may be obtained, for example, from the extracts of flowers, fruits, vegetables, and plants. Thus, personal care compositions may include *Camellia sinensis* (green tea) extract, *Daucus carota sativa* (carrot) root extract, or combinations thereof. *Camellia sinensis* (green tea) extract, which may be concentrate extracted from green tea leaves (INCI: *Camellia sinensis* Leaf Extract), can contain various polyphenols and catechin derivatives such as catechin, epigallocatechin, epicatechin, epicatechin gallate, epigallocatechin gallate, gallocatechin gallate, gallocatechin, or combinations thereof. Such constituents are effective scavengers of reactive oxygen species and may also function indirectly as antioxidants through their effects on transcription factors and enzyme activities.

Antioxidants also include, for example, carotenoids (e.g., beta-carotene, lycopene, lutein, zeaxanthin), additional polyphenols (e.g., resveratrol), selenium, vitamins, derivatives thereof, or combinations thereof. For example, a vitamin may be selected from vitamin A (retinoic acid), vitamin B (e.g., nicotinic acid or nicotinamide), vitamin C (ascorbic acid), vitamin E (tocopherol), or combinations thereof. Meanwhile, a vitamin derivative may be selected from esters of vitamin A (e.g., retinyl acetate, etc.), vitamin C (ascorbyl palmitate, etc.), vitamin E (e.g., tocopheryl acetate, tocopheryl palmitate, tocopheryl linoleate, etc.), or combinations thereof. Antioxidants to counter effects from IR radiation may include, for example, grape seed extract, vitamin E, tocopherol, ubiquinone, vitamin C, vitamin A (retinol), vitamin B (e.g., B3 niacinamide), vitamin C (ascorbic acid), vitamin E (tocopherol), derivatives thereof, polyphenols (e.g., flavonoids), ferulic acid, resveratrol, green tea extract, extracts from fruit, berries, vegetables and nuts, Coenzyme Q10, or combinations thereof.

Antioxidants may be present from about 0.0001 wt. % to about 1.0 wt. %, based on the total weight of the personal care composition. For example, *Camellia sinensis* (green tea) extract may be present in an amount of 0.005 wt. %, 0.01 wt. %, 0.045, 0.098, 0.15 wt. %, 0.2 wt. %, 0.3 wt. %, 0.5 wt. %, 0.99 wt. %, including every number and/or fraction therebetween, based on the total weight of the personal care composition. Similarly, one or more additional antioxidants such as *Daucus carota sativa* (carrot) root extract or a vitamin or derivative thereof may be present in an amount of 0.0001 wt. %, 0.001 wt. %, 0.005 wt. %, 0.01 wt. %, 0.045, 0.098, 0.15 wt. %, 0.2 wt. %, 0.3 wt. %, 0.5 wt. %, including every number and/or fraction there between, based on the total weight of the personal care composition.

Film former polymers may be capable of providing a substantially homogenous and/or structured hydro-lipidic film on skin. Generally, film former polymers may be synthesized from two or more different monomers to form copolymers and/or may from individual polymer chains that are connected by bridging molecules or crosslinking agents to form crosslinked copolymers known as cross polymers. For example, film former polymers may include monomers, copolymers, crosspolymers, and/or terpolymers of an organo-silicone hybrid, (meth)acrylate, abietic acid derivative, olefin, silicone, resin, vinyl acetate (VA), vinyl pyrrolidone (VP), maleate, alkyl ester, long chain or short chain carboxylic acid, or combinations thereof. For example, polymers to form films may have a molecular weight (MW) of about 1,500,000 Daltons (DA) or less.

Film former polymers may include crotonic acid/vinyl $C_8$-$C_{12}$ isoalkyl esters/VA/bis-vinyldimethicone crosspolymer, acrylate/dimethicone copolymer, VA/butyl maleate/isobornyl acrylate copolymer, acrylates/$C_{12-22}$ alkyl methacrylate copolymer, acrylates/octylacrylamide copolymer, methyl dihydroabietate, trimethylsiloxysilicate, $C_{24}$-$C_{28}$ alkyldimethylsiloxy trimethylsiloxysilicate, polymethylsilsesquioxane/trimethylsiloxysilicate, polymethylsilsesquioxane, perfluorononyl dimethicone, trifluoropropyldimethylsiloxy/trimethylsiloxy silsesquioxane, PPG-17/isophorone diisocyanate/dimethylol propionic acid copolymer, polyurethane (e.g., 32, 34, 35, 48, etc.), hydrolyzed wheat protein/PVP crosspolymers, maltodextrin/VP copolymer, butylated PVP copolymer, VP/polycarbamylpolyglycol ester, VP/dimethylaminoethylmethacrylate/polycarbamyl polyglycol ester, VP/Dimethiconyl-acrylate/polycarbamyl polyglycol ester, VP/eicosene copolymer, adipic acid/diglycol crosspolymer, trimethylpentanediol/adipic acid/glycerin crosspolymer, polyester-7 (and) neopentyl glycol diheptanoate, polyester-10 (and) propylene glycol dibenzoate, hydrogenated polycyclopentadiene (and) isododecane, stearyl/octyldodecyl citrate crosspolymer, hydroxyethyl acrylate/sodium acryloyldimethyl taurate copolymer, or combinations thereof.

A film former polymer may be present in an amount of about 0.1 wt. % to about 5.0 wt. %, based on the total weight of the personal care composition. For example, one or more film former polymers may be present in an amount of 0.08 wt. %, 0.5 wt. %, 1.0 wt. %, 2.0 wt. %, 2.5 wt. %, 3.5 wt. %, 5.1 wt. %, 6.0 wt. %, including every number and/or fraction therebetween, based on the total weight of the personal care composition.

Surfactants may include anionic, cationic, nonionic, amphoteric, or combinations thereof. Examples of useful anionic surfactants include, without limitation, carboxylates, amino acid derivatives, alkyl sulphates, alkyl ether sulfates, sulphonates, isethionates, taurates, sulfosuccinates, alkyl sulfoacetates, phosphates, alkyl phosphates, or combinations thereof. Examples of useful cationic surfactants include, without limitation, alkylamines, alkylimidazolines, quaternary ammonium compounds (QAC), or combinations thereof. Examples of useful nonionic surfactants include, without limitation, alkanolamides, amine oxides, esterified carboxylic acids, ethoxylated alcohols, poloxamers, or combinations thereof. Examples of useful amphoteric/zwitterionic surfactants include, without limitation, betaines, sultaines, cocamphoacetates, or combinations thereof.

Examples of emulsifiers, which are surfactants that can stabilize emulsions, may include oil-in-water (O/W) emulsifiers, W/O emulsifiers, or combinations thereof. An O/W emulsifier may have a hydrophilic-lipophilic balance (HLB) ≥7, preferably 8 to 18. Examples of useful O/W emulsifiers include, without limitation, certain sucrose esters (e.g., sucrose stearate, sucrose laurate, etc.), sorbitan esters (e.g., sorbitan laurate, etc.), polyglyceryl esters (e.g., polyglyceryl-3 methylglucose distearate, etc.), ethoxylated fatty ethers and ethoxylated fatty esters having a HLB≥7, or combinations thereof. Examples of useful natural O/W emulsifiers include, without limitation, cetearyl alcohol (and) cetearyl glucoside, glyceryl stearate (and) cetearyl alcohol (and) sodium stearoyl lactylate, cetearyl wheat straw glycosides (and) cetearyl alcohol, cetearyl olivate (and) sorbitan olivate, or combinations thereof. Thus, a personal care composition may include O/W emulsifiers such as glyceryl stearate (and) PEG-100 stearate, cetearyl alcohol (and) coco-glucoside, cetearyl alcohol (and) dicetyl phosphate (and) ceteth-10 phosphate, or combinations thereof.

Meanwhile, a W/O emulsifier may have a HLB of <7, preferably from 4 to 6. Examples of W/O emulsifiers include, without limitation, certain sucrose esters (e.g., sucrose distearate, etc.), sorbitan esters (e.g., sorbitan oleate, sorbitan dioleate, sorbitan stearate, etc.), polyglyceryl esters (e.g., polyglyceryl-4 isostearate, polyglyceryl dimerate isostearate, etc.), silicones (e.g., a copolymer of a silicone, an alkoxylated derivative of a silicone, or combinations thereof, such as cetyl polyethylene glycol (PEG)/polypropylene glycol (PPG)-10/1 dimethicone, lauryl PEG-8 dimethicone, etc.), fatty acid esters (e.g., glyceryl stearate, etc.), or combinations thereof. Examples of useful natural W/O emulsifiers include cetearyl olivate. Thus, a personal care composition may include W/O emulsifiers such as lauryl PEG-8 dimethicone, cetyl PEG/PPG-10/1 dimethicone, or combinations thereof. It is, however, understood that other emulsion formats may similarly be used such as, without limitation, oil-in-oil (O/O) or oil-in-silicon (O/S) emulsions (e.g., castor oil in silicone oil, etc.) to deliver ingredients (e.g., sunscreen filters, antioxidants, etc.) to a substance.

A surfactant may be present from about 0.1 wt. % to about 5.0 wt. %, based on the total weight of the personal care composition. A surfactant may, for example, be present in an amount of 0.008 wt. %, 0.1 wt. %, 1.0 wt. %, 2.0. wt. %, 3.0 wt. %, 4.0 wt. %, 5.2 wt. %, including every number and/or fraction therebetween, based on the total weight of the personal care composition.

Thickeners may alter viscosity. Examples of thickeners include plant-based polymer thickeners, mineral thickeners, wax thickeners, synthetic polymer thickeners, or combinations thereof. Plant-based polymer thickeners may include, without limitation, xanthan gum, konjac gum, guar gum, acacia gum, cellulose derivatives such as hydroxycellulose, hydroxyethyl cellulose, or combinations thereof. Mineral thickeners may include, without limitation, silica, bentonite, magnesium aluminum silicate, or combinations thereof. Natural or synthetic waxes may include, without limitation, animal waxes, vegetable waxes, mineral waxes, petroleum waxes, silicone waxes, or combinations thereof. Waxes with a melt point from about 50° C. to 100° C. may act as setting agents to solidify a formula.

Synthetic thickeners may include crosslinked polymers such as alkyl acrylate polymers in which the co-monomers consist of at least one of the following: acrylic acid, sodium acrylate, methacrylic acid, or alkyl acrylate. Polymers consisting purely of acrylic acid are often referred to as carbomers. Thus, for example, single molecules of carbomers can be crosslinked to provide a crosspolymer with a MW over 1 billion DA. In one example, acrylic acid may be crosslinked with allyl sucrose or allyl pentaerythritol. Similarly, a copolymer of $C_{10\text{-}30}$ alkyl acrylates and one or more monomers of acrylic acid, methacrylic acid or one of their simple esters may be crosslinked (e.g., with an allyl (2-propenyl) ether of sucrose or an allyl ether of pentaerythritol) to form acrylates/$C_{10\text{-}30}$ alkyl acrylate crosspolymer.

Thickeners may be present from about 0.01 wt. % to about 40.0 wt. %, based on the total weight of the personal care composition. A plant-based, mineral, or synthetic polymer thickener may, for example, be present in an amount of 0.05 wt. %, 0.1 wt. %, 0.5 wt. %, 1.0 wt. %, 2.0 wt. %, 3.0 wt. %, 3.5 wt. %, 4.0 wt. %, including every number and/or fraction therebetween, based on the total weight of the personal care composition. Meanwhile, wax thickeners used as a solidifying agent may be present in an amount up to about 30.0 wt. % such as, for example, 1.0 wt. %, 2.0 wt. %, 5.0 wt. %, 18.0 wt. %, 25.0 wt. %, including every number and/or fraction therebetween, based on the total weight of the composition.

While personal care compositions may be formulated to include one or more ingredients that exhibit or maximize absorbance (e.g., tungsten oxide, peptides, copper peptides, etc.), personal care compositions are preferably formulated to include at least one ingredient based on an ability to exhibit diffuse reflection that can be captured and processed to detect the personal care composition using at least the IR region of the electromagnetic spectrum. Ingredients that exhibit diffuse reflection include, without limitation, metal particles, mineral particles, synthetic particles, or combinations thereof. Useful ingredients that exhibit diffuse reflection include, without limitation, styrene acrylates copolymer and micronized cellulose (Sunspheres), polyurethane and acrylic acid-based microspheres, starch particles (Dry Flo types, Celus Bi Feel), silicas (fumed, etc.), metal oxide particles (e.g., iron oxide, zinc oxide, titanium oxide, aluminum oxide, etc.), mineral particles (e.g., mica, etc.), wax particles (Sunhancer ECO), or combinations thereof. Useful ingredients include, for example, titanium dioxide (and) $C_{12\text{-}15}$ alkyl benzoate (and) stearic acid (and) silica (and) alumina (and) polyhydroxystearic acid, titanium dioxide (and) $C_{12\text{-}15}$ alkyl benzoate (and) stearic acid (and) silica (and) alumina (and) polyhydroxystearic acid (and) iron oxides, iron oxides (and) $C_{12\text{-}15}$ alkyl benzoate (and) triethoxycaprylylsilane (and) polyhydroxystearic acid, or combinations thereof. Useful ingredients include, for example, titanium dioxide (and) triethoxycaprylylsilane, titanium dioxide (and) stearoyl glutamic acid, titanium dioxide (and) isopropyl titanium triisostearate, titanium dioxide (and) aluminum hydroxide (and) triethoxycaprylylsilane, titanium dioxide (and) aluminum hydroxide (and) stearoyl glutamic acid, titanium dioxide (and) aluminum hydroxide (and) isopropyl titanium triisostearate, or combinations thereof. Such ingredients are commercially available from KOBO Products Inc.

An ingredient that exhibits diffuse reflection or absorbance may be present from about 0.01 wt. % to about 30.0 wt. %, based on the total weight of the personal care composition. Particles may, for example, be present in an amount of 0.008 wt. %, 0.1 wt. %, 0.5 wt. %, 1.0 wt. %, 2.0. wt. %, 3.0 wt. %, 4.0 wt. %, 5.0 wt. %, 7.5 wt. %, 10.0 wt. %, 15.0 wt. %, 20.0 wt. %, 25.0 wt. %, 33.0 wt. %, including every number and/or fraction therebetween, based on the total weight of the personal care composition. Thus, for example, metal oxide particles may be selected based on an ability to provide reflected or scattered IR radiation.

Notably, an ingredient may be added to a personal care composition that exhibits sub-optimal, minimal, or no conventional functionality (e.g., owing to use levels, morphology, etc.). Additionally or alternatively, an ingredient may be added to a personal care composition that exhibits functionality not typically present in the type of personal care composition but is nonetheless present as a marker for a personal care composition. Additionally or alternatively, an ingredient may be added to a personal care composition that is selected to maximize diffuse reflection or absorbance (e.g., via morphology, use levels, etc.) for use as a marker for a personal care composition.

Turning back to FIG. 1, the system 10 includes a computing device 12. Examples of the computing device 12 include, without limitation, a desktop computer, a notebook computer, a tablet computer, a personal digital assistant (PDA), a media player, a smart device (e.g., a smartphone, a smart television, a smart mirror, a smart watch, augmented reality (AR) glasses, virtual reality (VR) glasses, etc.), a projector, an infotainment system, a server (e.g., cloud server, premise server, etc.), a hub, a switch, an Internet-of-Things (IoT) device, or combinations thereof. In the illustrated example, the computing device 12 includes a power supply 14 (e.g., battery, electrical plug, etc.) to supply power to the computing device 12. The computing device 12 also includes a processor 16 that may be implemented as one or more hardware complex instruction set computer (CISC) processors, reduced instruction set computer (RISC) processors, x86 instruction set compatible processors, multi-core processors, microprocessors, central processing units (CPU), graphics processing units (GPU), visual processing units (VPU), or combinations thereof. The illustrated processor 16 includes an integrated memory controller (IMC) 18 operatively coupled with system memory 20, which may be implemented as a volatile memory device such as, without limitation, random access memory (RAM), dynamic RAM (DRAM), static RAM (SRAM), or combinations thereof. The processor 16 may also be coupled with other data storage devices (not shown in the interest of brevity) such as, for example, cache memory, hardware registers, and the like.

The processor 16 is further operatively coupled with an input output (IO) module 22 that functions as a host device which communicates with hardware devices. In the illustrated example, the I/O module 22 communicates with mass storage 24 such as, e.g., non-volatile storage including a magnetic disk drive, optical disk drive, tape drive, internal storage device, attached storage device, flash memory, battery backed-up synchronous DRAM (SDRAM), solid state storage (SSD), network accessible storage devices, or combinations thereof. Other traditional hardware devices include, without limitation, sensors (e.g., temperature, humidity, positioning, force, inertial measurement units, etc.), peripheral user I/O devices (e.g., mouse, keyboard, trackpad, etc.), and the like. In embodiments, the processor 16 and the IO module 22 may be implemented together physically on the same semiconductor die.

The illustrated IO module 22 further communicates with display 26 implemented as a touch screen, a flexible display, a liquid crystal display (LCD), a light emitting diode (LED) display, an organic LED display, an AR display, a VR display, a projector display, or combinations thereof. In addition, the IO module 22 communicates with network interface 28 for a wide variety of wireless purposes such as cellular telephone (e.g., Wideband Code Division Multiple Access/W-CDMA, Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), LiFi (Light Fidelity, e.g., IEEE 802.15-7, Wireless Local Area Network/LAN Medium Access Control (MAC) and Physical Layer (PHY) Specifications), 5G (New Radio), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), NFC (Near Field Communication, ECMA-340, ISO/IEC 18092), and other radio frequency (RF) purposes. Additionally, the IO module 22 communicates with the network interface 28 for a wide variety of wired purposes such as Ethernet (IEEE 802.3 LAN/MAN CSMA/CD Access Method), HDMI (High-Definition Multimedia Interface, EIA/CEA-861), USB (Universal Serial Bus, USB 3.0, USB-C, etc.), Fiber Optics (IEEE 1591.2-2017, ANSI/TIA-568.3), and other wired network purposes. Examples of communication technologies in embodiments include, without limitation, a wire, cable, metal leads, printed circuit board (PCB), backplane, switch fabric, semiconductor material, twisted-pair wire, co-axial cable, fiber optics, and so on, or combinations thereof.

Notably, the IO module 22 further communicates with an image capture device 30 configured to capture values for IR radiation from light incident on a surface of an ingredient of a personal care composition. For example, image sensors 32 may be fed with a predetermined voltage (e.g., 5V) of electrical power to generate sensor signals that are electrically transferred as analog sensor signals through a pull-down resistor and converted to digital values via an analog-to-digital converter. The digital values may range from a minimum value (e.g., $n_{min}$-bit value, black pixel=0 for n=8) to a maximum value (e.g., $n_{max}$-bit value, white pixel=255 for n=8), and encompass grayscale values that are relatively closer to a middle value (e.g., $n_{mid}$-bit value, middle gray pixel=128 for n=8). Thus, the processor 16 may determine the presence of a personal care composition by pixel values closer to white pixels for ingredients of the personal care composition that scatter IR more effectively, pixel values closer to middle gray pixels for other materials that scatter IR less effectively, and/or pixel values closer to black pixels for other materials that absorb IR more effectively.

The processor 16 preferably infers the presence of personal care compositions based on the values by using ingredients as markers for personal care compositions and does not require the ingredient itself to be categorized or computer vision and imaging processing for a recognition of semantic objects (e.g., filtering, etc.). Moreover, establishing the presence of personal care compositions may allow the processor 16 to make further useful determinations related to, e.g., coverage area, formula functionality, application or reapplication guidance, replenishment services, product recommendations, and so on.

In embodiments, the values for IR radiation captured by the image capture device 30 may be from natural light. For example, IR radiation from the sun incident on a surface of an ingredient of a personal care composition may be scattered and values captured by the image sensors 32. Additionally or alternatively, emitted IR radiation from an emitter 34 of the image capture device 30 may interact with an ingredient of a personal care composition to form values for the reflected IR radiation captured by the image sensors 32. In the illustrated example, the emitter 34 is configured to emit IR radiation having a first IR pattern and the image capture device 30 is configured to capture reflected IR radiation having a second IR pattern that is different from the first IR pattern. For example, the image capture device 30 may be an integrated camera in the computing device 10 and the emitter 34 may emit IR radiation corresponding to a grid of emitted IR dots (e.g., a front-facing camera having a light-emitting diode projector to emit a grid of 30,000 IR dots) which are reflected and/or scattered to form reflected IR radiation corresponding to a grid of reflected IR dots (e.g., reflected IR patterns, reflected IR data, etc.) captured by the image sensors 32. The processor 16 may then utilize the reflected IR dots to detect a personal care composition. The processor 16 may also create a depth map or create an image that can be used for other purposes such as object recognition or feedback. Similarly, the image capture device 30 may be a standalone depth camera having the emitter 34 located between two image sensors 32 to capture stereo images of a scene at different points of view which may be processed by the processor 16. The image capture device 30 may also optionally capture and/or emit electromagnetic radiation in spectrums other that IR, such as the UV or visible light spectrums, to provide supplemental data for use by the processor 16 for other purposes.

The processor 16 further includes logic 36 to implement aspects of embodiments such as determining whether a personal care composition is present, whether functionality of a personal care composition is present, whether a sufficient or desired coverage area is achieved, guidance for application or reapplication, replenishment services, product recommendations, messages related to any of the aforementioned aspects, or combinations thereof. The logic 36 may be implemented as a module or related component in a set of instructions, in configurable logic such as programmable logic arrays (PLA), field programmable gate arrays (FGPA), complex programmable devices (CLPD), in fixed functionality hardware logic using circuit technology such as application specific integrated circuit (ASIC), complementary metal oxide semiconductor (CMOS) or transistor-transistor logic (TTL) technology, or combinations thereof. While the illustrated logic 36 is integral with the processor 16, any or all components of the logic 36 may be integral with another component of the computing device 12 or with one or more other computing devices in the system 10 such as, without limitation, wearable devices, smart devices, servers, and so on.

Similarly, while the illustrated example has provided various components of the computing device 12, one or more components of the computing device 12 may reside in the same and/or different physical and/or virtual locations, may be combined, omitted, bypassed, re-arranged, and/or be utilized in any order. For example, any or all of the components of the computing device 12 may be integral or mechanically releasably connected (e.g., as hardware adapters, hardware modules, etc.) to one another in the system 10. In another example, the processor 16 and the image capture device 30 may physically reside on the computing device 12. In another example, the image capture device 30 may be distributed among various devices physically located anywhere proximate to a user in the system 10 (e.g., a flood light, a fixture, an IoT device, a smart device such as smart mirror, etc.) and operatively coupled to each other, to the computing device 12, and/or to another computing device in the system 10. Moreover, any or all components of the system 10, such as a component of the computing device 12 or of the image capture device 30, may be automatically implemented (e.g., without human intervention, etc.).

As discussed herein, a user may enter a room and face a smart device such as a smart television or a smart mirror which renders an image of the user on a display thereof. An image capture device of the smart device may collect reflected IR radiation that is processed to detect the personal care composition and optionally, e.g., determine whether a sufficient or desired coverage is achieved, etc. If not, the smart device may render a message to a user (e.g., a virtual object on the image of the user, etc.) to indicate the insufficiency (e.g., not present, coverage gaps, relatively low amount present, etc.). When the user begins to apply or reapply, the smart device may provide guidance such as a verbal direction concerning where or how to apply, an alarm when nearing or crossing an application boundary, rendering of zones or markers for application or avoidance, and so on. Similarly, in another example, a user may apply a personal care composition to another user based on presence, sufficiency, or guidance provided via AR glasses or VR glasses in real-time. For example, the image capture device may be integral with AR glasses to capture objects in its field of view including the other user. Similarly, a user may self-apply based on presence, sufficiency, or guidance via a display of a smartphone in real-time using a front-facing camera to capture IR radiation.

Accordingly, rather than using IR radiation for object recognition or to screen a composition for effectiveness against IR radiation, which are not precluded in embodiments, IR radiation may be used to establish whether a personal care composition is present, to determine a coverage area, to provide guidance, and so on. Moreover, using hardware already present in computing devices (e.g., smartphones with IR cameras for authentication purposes, etc.) minimizes a need for external adapters or benchtop equipment while allowing wide-spread use in substantially real-time. Detecting a personal care composition based on values for reflected IR radiation may also be used to establish formula functionality. For example, UVA protection, HEV protection, antioxidant potency, anti-aging potency, etc., may be established based only on values for reflected IR radiation from ingredients that may be added for purposes unrelated to ingredient functionality (such as diffuse reflection) and are used as markers. For example, UVA protection from organic sunscreen filters may be inferred from presence and/or coverage area of the personal care composition detected using values for reflected IR radiation from an ingredient (such as a metal oxide particle added for diffuse reflection) whether or not the ingredient provides any photoprotection.

Figure 2:
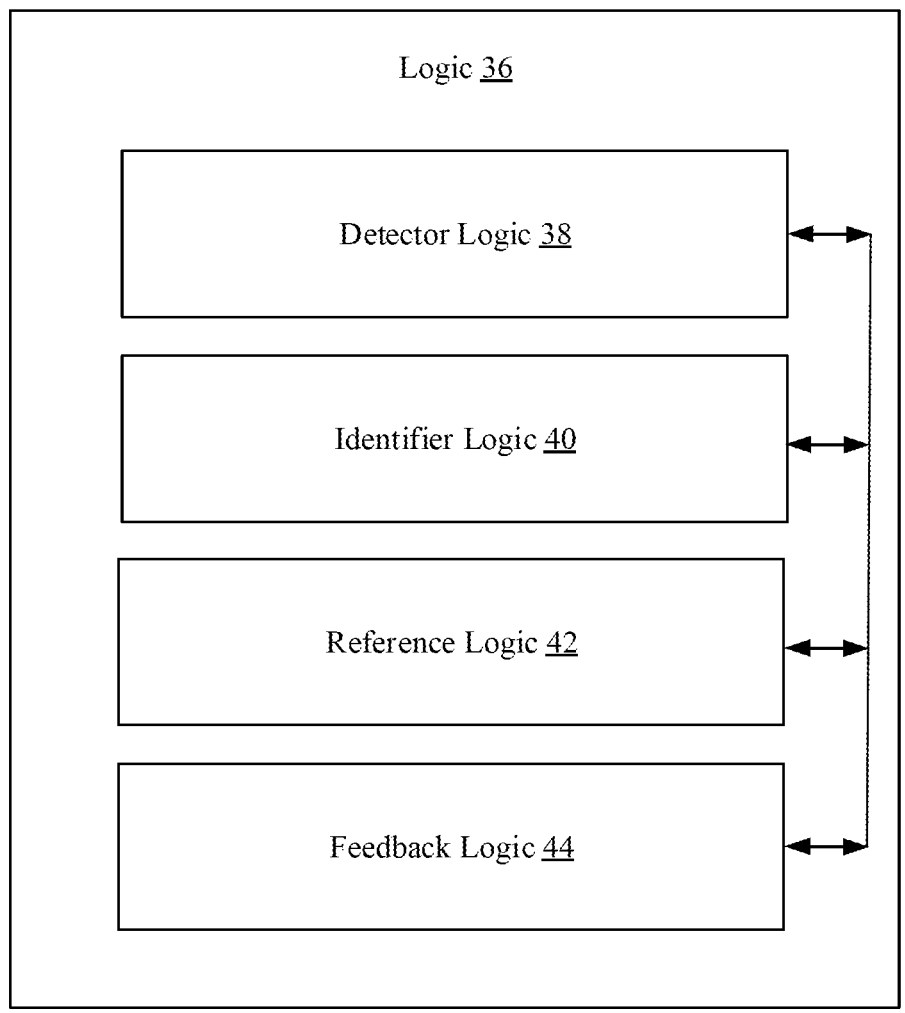
FIG. 2 illustrates an example of logic to detect a personal care composition based on values for infrared (IR) radiation from an interaction between light and one or more ingredients of the personal care composition according to an embodiment.

Turning now to FIG. 2, the logic 36 includes detector logic 38 to detect the presence of a personal care composition based on values for IR radiation resulting from an interaction between light and an ingredient of the personal care composition. The detector logic 38 may, for example, process IR radiation at a pixel level so that pixel values are used to determine whether the personal care composition is present. For example, the detector logic 38 may detect pixel values relatively closer to white pixels corresponding to an ingredient that scatters light relatively more effectively than other materials such as skin and therefore establishes the presence of the personal care composition based on the pixel values themselves. The detector logic 38 may also detect pixel values that satisfy a predetermined threshold pixel value (e.g., between white pixels and middle gray pixels, etc.) corresponding to an ingredient that scatters light relatively more effectively than other materials such as skin and therefore establishes the presence of the personal care composition based on the predetermined threshold pixel values. The detector logic 38 may also detect a cluster of pixel values within a region of an image (e.g., clusters of white pixels, grayscale pixels, black pixels, etc.) to establish the presence of the personal care composition. It is understood that pixel values relatively closer to black pixels may additionally or alternatively similarly be used.

While pixel values are described herein for illustration, the logic 36 may use any IR value. For example, the detector logic 38 may detect a personal care composition using voxel values (e.g., relatively closer to white voxels), predetermined threshold voxel values, clusters of voxels, or combinations thereof. In another example, digital values from an analog-to-digital converter may be normalized to an intensity scale from a minimum value (e.g., zero=black, full absorbance) to a maximum value (e.g., one=white, full reflectance). A reference value for skin may optionally be captured and utilized as a threshold value or some other threshold value may be set, above or below which a personal care composition may be detected, coverage may be determined, and so on, or combinations thereof. Thus, for example, the detector logic 38 may utilize values corresponding to reflectance or absorbance alone, or together with thresholds, other information, sensors, etc., or combinations thereof. Calculations, such as integrations and ratios, may also be utilized to evaluate effectiveness of the personal care composition. Moreover, and without categorizing an ingredient (e.g., metal, etc.), the detector logic 38 may detect a personal care composition having a plurality of ingredients based on values corresponding to IR radiation from one or more ingredients thereof that exhibit or maximize diffuse reflection and/or that exhibit or maximize absorption.

The logic 36 further includes identifier logic 40 to identify a personal care composition. The identifier logic 40 may, for example, access a database structure (e.g., table, tree, etc.) stored in system memory or mass storage, such as the system memory 20 or mass storage 24 (FIG. 1), to compare values for IR radiation captured in real-time using an image capture device, such as the image capture device 30 (FIG. 1), against values for reference IR radiation stored in the database structure. The IR radiation captured may, for example, correspond to values that fall within a range of stored reference values for specific particles or combination of particles (e.g., titanium oxide, zinc oxide, aluminum coated titanium dioxide, fumed silica etc.), types of particles (e.g., rutile titanium dioxide, etc.), concentrations of particles in a personal care composition (e.g., wt. % use levels, etc.), concentrations of particles applied per unit area (e.g., per 2.0 mg/cm$^2$ sample, etc.), particle functionality (e.g., sunscreen filter, matting agent, etc.), formulation formats (e.g., emulsion, lotion, cream, oil, alcohol, anhydrous, etc.), a combination of ingredients (e.g., titanium dioxide in combination with zinc oxide, with an emulsifier, etc.), a combination of types of ingredients (e.g., film formers, wax, silicones, coatings such as aluminum or esters, specific ingredients thereof, etc.), formulation functionality (e.g., anti-aging, insect repellent, sunscreen, anti-acne, moisturizing, etc.), specific products (e.g., specific sunscreen product, etc.), or combinations thereof.

The identifier logic 40 may, for example, implement a look-up using the values (e.g., pixel values, voxel values, normalized values, etc.) to the database structure and identify a personal care composition based on a match (within a predetermined identify %) between values for IR radiation captured in real-time and values for reference IR radiation stored in the database structure. The identifier logic 40 may additionally or alternatively utilize other information in the database structure or directly determine other information useful to identify a personal care composition. For example, the identifier logic 40 may identify a personal care composition based on stored or determined product metadata such as active ingredients, inactive ingredients, brand, product name, marketing claims, product identifier, trademark, ingredient functionality, product functionality, or combinations thereof. The identifier logic 40 may also identify a personal care composition based on stored or determined sensor data (e.g., temperature, GPS, etc.), user profile data (e.g., user preference data, etc.), historical data (e.g., use pattern for a user, for a group of users, etc.), user prompts (e.g., user input, etc.), context data, or combinations thereof.

The logic 36 further includes reference logic to capture reference data. Reference logic 42 may, for example, capture reference IR radiation and/or map the values for the reference IR radiation to specific particles, specific types of particles, concentrations of particles in a personal care composition, concentrations of particles applied per unit area, ingredient functionality, formulation formats, a combination of ingredients, a combination of types of ingredients, formulation functionality, specific products, other information, or combinations thereof. The reference logic 42 may capture a static value (e.g., a static reference value for reference IR radiation) corresponding to a personal care composition under test or normal use conditions (e.g., in vitro on a testing plate, in vivo under testing or use conditions, etc.). Additionally or alternatively, the reference logic 42 may capture a set of dynamic values (e.g., a set of dynamic reference values for reference IR radiation) corresponding to a personal care composition under one or more use conditions. For example, the reference logic 42 may capture a set of time-series values for reference IR radiation that provides a range of reference values for a personal care composition over time. The reference logic 42 may also capture a set of water-resistance values for reference IR radiation that provide a range of reference values for a personal care composition after exposure to water or sweat conditions. Other examples of use conditions include, without limitation, humidity, temperature, pressure, skin type, exposure to sunlight, or combinations thereof. When sets of values are used, all values, subsets of values, and/or other combinations of values (e.g., running average, median, mean, etc.) may be useful as reference values that are captured and stored.

In embodiments, the reference logic 42 may access preconfigured values, may prompt a user to collect values, and/or may automatically perform a capture and/or storage operation related to values when, for example, a user launches an application to detect a personal care composition, an image capture device is activated or captures images, a user prompts a computing device for a capture event (e.g., via text or speech command, gesture, etc.), or combinations thereof. For example, the reference logic 42 may communicate with a user via a user interface, such as a graphical user interface (GUI) rendered by the display 26 (FIG. 1), to capture an image of a body area before and/or after a personal care composition has been applied to a body part. Values for IR radiation (e.g., pixel values, voxel values, normalized values, etc.) may then be stored as reference IR data (as baseline or during a training process) or may be compared in real-time to stored values for reference IR radiation or otherwise used with other information to implement one or more aspects of embodiments (in response to detection, provide other information for training, identification, feedback, etc.). A training process may, for example, gather additional data such as demographic information, purchase history, geographic location, use habits, use preferences, context, etc.

Additionally or alternatively, the reference logic 42 may prompt and/or automatically receive from a user product metadata corresponding to a personal care composition to be applied or already applied to a body part. The reference logic 42 may, for example, prompt and/or automatically receive from a user (e.g., via a drop-down menu, radial selection, tabs, icons, text, speech, etc.) information related to a personal care composition such as active ingredients, inactive ingredients, brand, product name, marketing claims, product identifier (e.g., SKU), trademark, product functionality (e.g., SPF, water resistance, antioxidant power, anti-aging power, insect repellent power, etc.), or combinations thereof. For example, the reference logic 42 may prompt and/or automatically receive natural language from a user that identifies a personal care composition from information on a product label, and may execute traditional speech-to-text or machine learning processes to parse or identify keywords that can be used to identify the personal care composition. The reference logic 42 may also prompt a user with an inquiry via a user interface (e.g., microphone, display, tactile interface, etc.) to obtain specific information such as ingredients, brand, name, marketing claims, SKU, trademark, product functionality, and so on, or combinations thereof.

Additionally or alternatively, the reference logic 42 may use product information (e.g., name of the product) to access publicly available information via a network interface, such as the network interface 28 (FIG. 1), which can be stored as product metadata for a personal care composition. The reference logic 42 may, for example, parse user input (e.g., to identify a brand or trademark and/or a name of a product) and perform a search on a manufacturer web page for a product using the user input. The reference logic 42 may also parse user input (e.g., product name, etc.) and perform an internet search query using the user input until web page results provide a match having ingredient and/or other product information. In embodiments, the publicly available product information may be stored and/or a pointer to the information such as a URL or other address (e.g., IP address, etc.) may be stored.

Additionally or alternatively, the reference logic 42 may use an identifier such as an RFID tag or other digital code (e.g., UPC, QR code, etc.) located on the label or other packaging component (e.g., cap, container, etc.) to access public or private information. Similarly, the reference logic 42 may implement object recognition technology to identify a product, a label, ingredients, brand, name, marketing claims, SKU, trademark, and so on, or combinations thereof. For example, the reference logic 42 may utilize text or packaging features such as container shape or applicator shape or type to identify a product using public or private databases (e.g., retailer websites, design databases, catalogs, etc.). If more information is desired after an object recognition process, the reference logic 42 may utilize any or all of the aforementioned processes to obtain remaining needed information or desired information.

Accordingly, the reference logic 42 may capture a concentration of ingredients from publicly available information such as websites, labels, or combinations thereof. For example, the concentration of metal oxide particles used as sunscreen filters may be identified and associated to values for IR radiation of the metal oxide particles, the metal oxide particles in a particular personal care composition, the metal oxide particles applied per unit area (if the area is determined), specific products, or combinations thereof. Similarly, publicly available information may be used to associate real-time values to a combination of ingredients, a combination of types of ingredients, specific products, or combinations thereof. However, the reference logic 42 may also access non-public information related to active ingredients, inactive ingredients, marketing claims, formulation functionality, and so on, or combinations thereof. Thus, the reference logic 44 may access non-publicly available information to map real-time values and/or reference IR radiation to, for example, specific types of particles, etc.

Moreover, inactive ingredients such as metal oxide particles (e.g., colorants, etc.) may not be listed with corresponding concentrations on a label or on a website. Thus, the reference logic 42 may access non-public information to identify an exact ingredient used, an exact concentration of the ingredient, an exact formulation format, an exact ingredient functionality, or combinations thereof. In this regard, the reference logic 42 may utilize traditional security technology to protect any non-public information such as on-platform memory or storage encryption (e.g., where the information is loaded and stored locally in encrypted memory, etc.), virtual private networks, secure socket layers, network encryption channels (e.g., one-way encryption, two-way encryption, etc.), or combinations thereof. In one example, credentials used for an application launched to detect a personal care composition may also authenticate a user to transmit information to a secure cloud server (e.g., as part of a subscription service, etc.) which performs and/or maintains mappings. Thus, optionally encrypted information from the reference logic 42 (e.g., responses to prompts, images of body areas, images of products, reflected IR radiation, product codes, etc.) may be used together with non-public information to implement one or more aspects of the logic 36 located on a private and secure server that communicates with the user via the application.

It is therefore understood that any captured information from any data sources (e.g., public and non-public information, sensors, user input, user profiles, historical data, context data, etc.) may be used with values for reference IR radiation or may be used directly with real-time values for IR radiation in response to a detection of a personal care composition without requiring values for reference IR radiation to implement one or more aspects of embodiments (e.g., training, identification, feedback, etc.). For example, embodiments may detect a personal care composition based on values for IR radiation, and directly in response to the detection, may implement training, identification, and/or feedback by initiating a capture of or access to product metadata, initiating a capture of or access to sensor data, prompting a user, determining identifiers, initiating object recognition, and so on.

The logic 36 further includes feedback logic 44 to determine whether a sufficient or desired coverage is achieved, to provide guidance to a user for application or reapplication, or combinations thereof. For example, reflected IR radiation may fall outside an acceptable range or within a lower end of an acceptable range of reference IR values or a threshold for a personal care composition, and the feedback logic 44 generates an output related to sufficiency of coverage. Output from the feedback logic 44 may additionally or entirely be based on other data such as product metadata, identification (e.g., of a personal care composition, etc.), information in a data structure, data from a sensor (e.g., GPS, clock, etc.), context data (e.g., time of day, geographic location, time of last application, calendar, etc.), data from a user profile (e.g., user preference for a level of protection desired, a deviation from a label direction, etc.), historical data (e.g., use data for a user or group or users, etc.), user prompt data (e.g., user input, etc.), or combinations thereof. Thus, the feedback logic 44 may determine sufficiency based on pixel, voxel, and/or normalized values alone (e.g., actual or inferred protection or coverage area from presence, location, intensity, etc.) or with other information (e.g., actual or inferred protection or coverage from ingredient concentration, active ingredient power, water resistance, etc.). The output from the feedback logic 44 may therefore be based on the values for IR radiation alone (e.g., presence, location, intensity, etc.) and/or together with product metadata, product identification (e.g., mineral sunscreen product, with or without using reference IR radiation), exact concentration of ingredients (e.g., wt. %), formulation functionality (e.g., UVA/UVB protection, water resistance, etc.), user preference (e.g., maximum level of protection, etc.), sensor data, etc.

The output from the feedback logic 44 may include a visual message (e.g., via an LED indicator, a rendered image, text, etc.), an audio message (e.g., via a speaker, etc.), a tactile message (e.g., via a tactile sensor, etc.), or combinations thereof. For example, the feedback logic 44 may provide a heat map to a user indicating varying levels of coverage on an image rendered to a user via a display such as the display 26 (FIG. 1). The heat map may be constructed based on pixel values corresponding to values for IR radiation (e.g., reflected IR radiation). In another example, the feedback logic 44 may provide a raw IR image depicting pixel values whose intensity, magnitude, and/or location indicate varying levels of coverage. The feedback logic 44 may also superimpose visual markers on an image displayed in the RGB space to indicate varying levels of coverage. Virtual markers on an RGB image may include arrows, flashing pixels, perimeter outlines, lines, color changes, or combinations thereof. The feedback logic 44 may also utilize other graphics to convey feedback such as graphs, coverage level icon bars or meters, LED indicators with frequency or color changes, or combinations thereof. The feedback logic 44 may also utilize audio markers such as alarms, tactile markers such as buzzing, or combinations thereof. Thus, without necessarily recognizing an object, the feedback logic 38 conveys sufficiency or other feedback to a user based on a detection of a personal care composition using values corresponding to reflected IR radiation from one or more ingredients that exhibit or maximize diffuse reflection or absorption.

The feedback logic 44 may, for example, provide guidance for application or reapplication of a personal care composition based on the presence of a personal care composition alone or further based on a combination with other information such as, for example, identification of a personal care composition, exact concentration of ingredients, formulation functionality, user preference, historical data, user prompts, or combinations thereof. For example, the feedback logic 44 may overlay markers on an image displayed via the display 26 (FIG. 1) to indicate where a personal care composition might be needed, desired, avoided, or combinations thereof. Guidance may similarly include audio messages (e.g., instructions, alarms when nearing or crossing an application boundary, etc.), tactile messages (e.g., a buzz when nearing or crossing an application, etc.), or combinations thereof.

The feedback logic 44 may further determine a region of interest (ROI) in a scene captured by an image capture device such as the image capture device 30 (FIG. 1). The ROI may be a body part such as a face of a user, a neck of a user, an arm of a user, a torso of a user, a hand of a user, a leg of a user, a foot of a user, and so on, a portion thereof such as a part of all of a cheek, a forehead, a nose, a finger, a toe, and so on, or combinations thereof. The feedback logic 44 may automatically determine the ROI using image recognition processes based on reflected IR radiation and/or data from one or more other regions of the electromagnetic spectrum such as the visible light spectrum (e.g. RGB data). Additionally or alternatively, the feedback logic 44 may prompt and/or automatically receive from a user an indication of the ROI. For example, a graphical user interface (GUI) may be used by the user to input the ROI (e.g., selection of an ROI via a touch of a region in an image displayed, a gesture towards a region displayed, outline of a region, selection of an object, selection from an option in a menu, etc.). Thus, a user may capture their own image (e.g., video, frames, still images, etc.) and select an ROI from the image, may provide audible input user (e.g., when a user makes a request or approves a prompt for an ROI) to define the ROI, and so on.

The feedback logic 44 may, therefore, determine whether a sufficient or desired coverage area in an ROI is achieved, identify a body area for application or reapplication using an ROI, provide guidance to a user for application or reapplication using an ROI, or combinations thereof. For example, the feedback logic 44 may determine a sufficient or desired coverage area in an ROI is achieved for a personal care composition based on reflected IR radiation that indicates the personal care composition is present in the ROI and optionally based on reflected IR radiation that indicates the personal care composition is not present in the ROI (e.g., bare skin). Similarly, the feedback logic 44 may determine whether a sufficient or desired coverage area in an ROI is achieved for a personal care composition based on whether a type of personal care composition having a type of active agent is present in the ROI (body area on which the type of active agent is intended to target). In another example, a boundary for application or reapplication guidance may be based on an ROI. The ROI may, therefore, enhance accuracy and minimize unnecessary processing outside the ROI.

The feedback logic 44 may also provide replenishment services to a user, provide product recommendations to a user, or combinations thereof. The feedback logic 44 may, for example, track a frequency of use for a personal care composition based on each time the personal care composition is detected, based on a frequency of application, based on a frequency of reapplication, coverage area, or combinations thereof. When a plurality of computing devices are used the feedback logic 44 may use an identifier for the product (e.g., RFID, product code, shape, etc.) or determine that the plurality of computing devices are geographically proximate to one another and are independently using an application to detect a same personal care composition. The feedback logic 44 may also issue a prompt to two or more of the computing devices to confirm the product is the same, or determine the product is the same when the application to detect the composition is launched with a same user profile or a profile from among a plurality of related profiles (e.g., family member, etc.). The feedback logic 44 may, however, determine the product is the same when the values corresponding to the reflected IR radiation are substantially similar (e.g., >90% match, etc.).

The feedback logic 44 may compare the tracked use against historical data for a user or a set of users (e.g., users having similar features, users in similar geographic locations, same sex, age, lifestyle, etc.) to predict the end of life of the product and provide a replenishment message. For example, the feedback logic 44 may determine that a user applies a personal care composition frequently and reapplies frequently to issue a replenishment message before the product is exhausted based on a predetermined frequency value, a historical pattern of replenishment under similar conditions, or combinations thereof. The feedback logic 44 may also compare the tracked use against product metadata such as volume, expiration date, or combinations thereof. Thus, the feedback logic 44 may determine that a user applies a personal care composition frequently and reapplies frequently to issue a replenishment message before the product is exhausted based on knowledge about the size of the packaged product. Additionally or alternatively, the feedback logic 44 may automatically replenish the product based on the tracked use. Thus, a user may set a preference for automatic replenishment with or without a replenishment message at any selected periodicity (e.g., before next summer, at 95% lifespan, etc.). A replenishment message may be visual, auditory, tactile, or combinations thereof. Replenishment services may also provide consumer incentives, such as coupons, new product offers, and so on.

The feedback logic 44 may further provide product recommendations based on the tracked use. For example, the feedback logic 44 may determine that a user applies a personal care composition more frequently than directed and issues a product recommendation message for a more potent version of the product (e.g., optionally further based on a use preference, based on historical use data, etc.) or a product recommendation message that conveys the directions for use (e.g., optionally from the label, a web site, etc.). In another example, the feedback logic 44 may determine that a user applies a personal care composition at a certain frequency to issue a product recommendation message for a companion product with or without consumer incentives.

For example, the feedback logic 44 may issue a product recommendation message for an after-sun product based on a determination that a user has applied a sunscreen personal care composition. In another example, the feedback logic 44 may issue a product recommendation message for a moisturizing product when a user has applied a scrub personal care product. In another example, the feedback logic 44 may issue a product recommendation message for an after-shave when a user has applied a shaving preparation. In another example, the feedback logic 44 may issue a product recommendation message for a concealer when a user has applied a foundation. A product recommendation message may be a visual message, an auditory message, a tactile message, or combinations thereof. The feedback logic 44 may also utilize the product identifiers, prompts, application use data, historical data, product metadata, etc., to issue messages.

Figure 3:
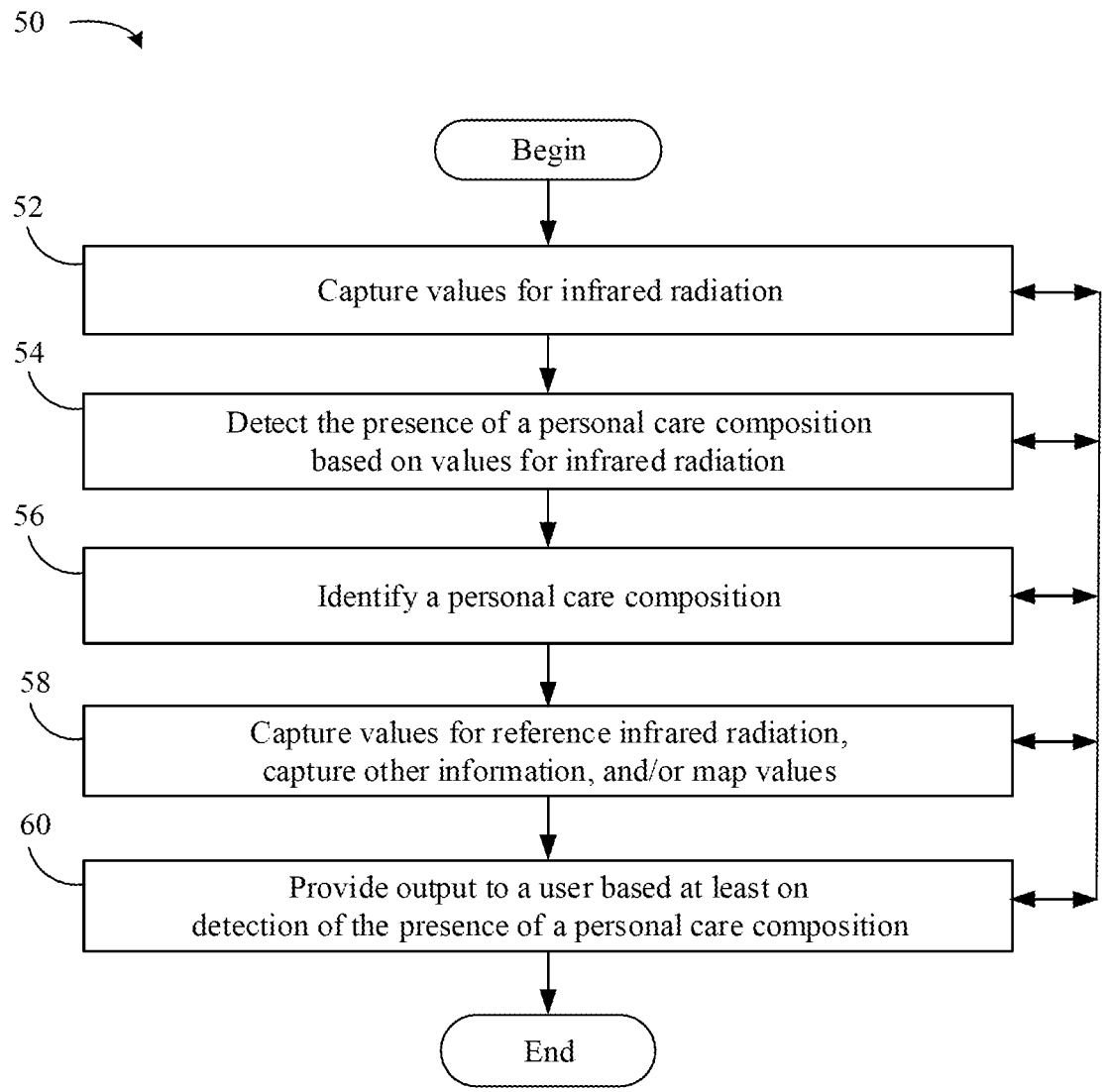
FIG. 3 is an illustration of an example of a method to detect a personal care composition based on values for infrared (IR) radiation from an interaction between light and one or more ingredients of the personal care composition according to an embodiment.

Turning now to FIG. 3, a method 50 is shown to detect a personal care composition according to an embodiment. The method 50 may be implemented by a component of the system 10 (FIG. 1) and/or the logic 36 (FIG. 2), discussed above. The method 50 may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or transistor-transistor logic (TTL) technology, or any combination thereof. Computer program code to carry out operations shown in the method 50 may be written in any combination of one or more programming languages, including an object-oriented programming language such as JAVA, SMALLTALK, C++ or the like and conventional procedural programming languages, such as the "C" programming language or similar programming languages. Meanwhile, logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, CPU, microcontroller, etc.).

Processing block 52 captures values for IR radiation from an interaction between light and an ingredient of a personal care composition. Block 52 may, for example, capture values for IR radiation from natural light sources, from an emitter, or combinations thereof. In one example, block 52 provides emitted IR radiation that is to be converted to the values for IR radiation. For example, block 52 may emit IR radiation corresponding to a grid of emitted IR dots (e.g., emitted IR pattern, etc.) which are reflected/scattered to form reflected IR radiation corresponding to a grid of reflected IR dots (e.g., reflected IR pattern). Block 52 may also convert sensor signals, corresponding to the reflected IR radiation, to digital values such as, without limitation, pixel values, voxel values, normalized values, or combinations thereof.

Processing block 54 detects the presence of a personal care composition based on values for IR radiation. Block 54 may, for example, established the presence of the personal care composition based on pixel values, voxel values, and/or normalized values corresponding to reflected IR radiation. For example, block 54 may detect pixel values relatively closer to white pixels for an ingredient that scatters light relatively more effectively than other materials such as skin to establish the presence of the personal care composition based on the pixel values themselves. Block 54 may also detect pixel values that satisfy a predetermined threshold pixel value for an ingredient that scatters light relatively more effectively than other materials such as skin to establish the presence of the personal care composition based on the predetermined threshold pixel values. Block 54 may also detect a cluster of values to establish the presence of the personal care composition.

Block 54 may, for example, compare a normalized value to a threshold, above or below which the personal care composition may be detected. For example, block 54 may utilize digital values corresponding to absorbance alone or together with predetermined threshold values to detect the personal care composition. Thus, and without necessarily categorizing an ingredient (e.g., metal, etc.), block 54 may detect a personal care composition having a plurality of ingredients based on values corresponding to IR radiation from one or more ingredients thereof that exhibit or maximize diffuse reflection or that exhibit or maximize absorption, based on the values themselves and/or based on a threshold value.

Processing block 56 identifies a personal care composition. Block 56 may, for example, access a data storage device that has values for reference IR radiation to identify the personal care composition. For example, block 56 may compare values for reflected IR radiation captured in real-time against values for reference IR radiation stored in a database structure to identify the personal care composition. Block 56 may, for example, implement a look-up operation using pixel values, voxel values, and/or normalized values to the database structure and identify the personal care composition based on a match (within a predetermined identity %) between values for IR radiation captured in real-time and values for reference IR radiation. In one example, the data structure may include values for the reference IR radiation that are mapped to specific particles or combination of particles, types of particles, concentrations of particles in a personal care composition, concentration of particles applied per unit area, particle functionality, formulation format, a combination of ingredients, a combination of types of ingredients, specific products, or combinations thereof.

Block 56 may additionally or alternatively utilize patterns (e.g., IR dot patterns) to identify the personal care composition. Moreover, since the data structure may include other information such as, without limitation, product metadata, sensor data, user profile data, historical data, user prompt data, context data, etc., or combinations thereof, block 56 may additionally or alternatively identify the personal care composition using the other information. Block 56 may, for example, identify the personal care composition based on stored or determined product metadata such as active ingredients, inactive ingredients, brand, product name, marketing claims, product identifier, trademark, ingredient functionality, formulation functionality, or combinations thereof. Block 56 may also identify the personal care composition based on stored or determined sensor data (e.g., temperature, GPS, etc.), user profile data (e.g., user preference data, etc.), historical data (e.g., use pattern for a user, for a group of users, etc.), user prompt data (e.g., user input, etc.), context data, or combinations thereof. In one example, no comparison between values for IR radiation captured in real-time and values for reference IR radiation may be needed such as when block 54 detects the presence of a personal care composition based on the values for the IR radiation and in response block 56 only uses other information such as, e.g., sensor data, historical data, user profile data, product metadata, tracked use data, prompt data, etc.

Processing block 58 captures values for reference IR radiation, captures other information such as product metadata, sensor data, historical data, user profile data, user prompt data, context data, etc., or combinations thereof. Block 58 may, for example, capture a static value such as a static real-time value, a set of dynamic values such as a set of dynamic real-time values, or combinations thereof. The set of dynamic values may include, for example, a set of time-series values, a set of water-resistance values, or combinations thereof. Block 58 may also capture product metadata including an identification of an active ingredient, inactive ingredient, brand, product name, marketing claim, product identifier, trademark, ingredient functionality, formulation functionality, or combinations thereof. Block 58 may determine the product metadata from publicly available information, non-public information, or combinations thereof. Block 58 may determine the product metadata from a web page search, a product label, a packaging component, or combinations thereof. Block 58 may determine the product metadata using object recognition processes.

Block 58 may determine the product metadata from non-public information such as, without limitation, a formula listing having an exact ingredient used, an exact concentration of the exact ingredient used, an exact formulation format of the personal care composition, an exact functionality of the exact ingredient used, or combinations thereof. Block 58 may additionally or alternatively map the values for the reference IR radiation to the other information such as, without limitation, specific ingredients, combinations of ingredients, types of ingredients, combinations of types of ingredients, concentrations of ingredients, ingredient or formula functionality, formulation formats, specific products, historical data, user profile data, user prompt data, sensor data, tracked use data, or combinations thereof.

Processing block 60 provides output to a user based on the values for IR radiation. In the illustrated example, block 60 provides output to a user based at least on a detection of the presence of a personal care composition. Block 60 may, for example, determine whether a sufficient or desired coverage is achieved, identify a body area for application or reapplication, provide guidance to a user for application or reapplication, or combinations thereof. Thus, for example, block 60 may provide output related to sufficiency of coverage based on reflected IR radiation that falls outside or inside of an acceptable range or within a lower end or upper end of an acceptable range of values for a personal care composition. Block 60 may also determine an ROI in a scene captured by an image capture device to provide the output based on the ROI. Thus, for example, block 60 may determine whether a sufficient or desired coverage area in an ROI is achieved, provide guidance to a user for application or reapplication using an ROI, or combinations thereof.

The output from block 60 may be further based on an identification of a personal care composition, values for reference IR radiation, product metadata, sensor data, user profile data, tracked use data, historical data, application use data, user prompts, etc., or combinations thereof. Thus, for example, block 60 may determine sufficiency of coverage based on reflected or absorbed IR pixel values alone or together with an identification of a personal care composition (e.g., mineral sunscreen product), exact concentration of ingredients (e.g., wt. %), ingredient or formulation functionality (e.g., SPF, water resistance, etc.), user preference data (e.g., maximum level of protection, etc.), etc., or combinations.

The output may include, for example, a visual message to a user, an audio message to the user, a tactile message to the user, or combinations thereof. For example, the output from block 60 may include a heat map to a user indicating varying levels of coverage on an image rendered to a user, a raw IR image depicting pixel values whose intensity, magnitude, and/or location indicate varying levels of coverage, visual markers superimposed on an image, graphics, frequency or color changes on LED indicators, audio alarms, tactile alarms, or combinations thereof. Block 60 may, for example, provide guidance to a user for application or reapplication, replenishment services, product recommendations, or combinations thereof. For example, block 60 may use markers or zones to indicate areas for application of a personal care composition, areas to avoid, and so on. Messages corresponding to application, services and/or recommendations may be based only on the presence of a personal care composition or may be optionally further based on a combination with other information such as, for example, identification of a personal care composition, concentration of ingredients, formulation functionality, product metadata, sensor data, user preference data, tracked use data, historical data, application use data, user prompts, context data, etc.

Block 60 may also adjust messages with modified values that account for identification of a personal care composition, exact concentration of ingredients, functionality, user preference, or combinations thereof. For example, block 60 may modify a pixel value with a weight based on knowledge that a user desires more protection or potency from a user profile, from a prompt, from historical data, or combinations thereof. In one example, a middle gray pixel value may be adjusted towards a black pixel value when a user desires or typically uses relatively more of the personal care composition having an ingredient that exhibits diffuse reflection. Thus, a rendered heat map or raw IR image may show that more personal care composition is needed in an area despite having the personal care composition present or despite already having a generally accepted sufficient amount capable of providing ingredient or formulation functionality. Similarly, an output marker may be adjusted. For example, a virtual marker superimposed on an image may be adjusted in color, size, fill, etc. Similarly, a tactile or audio maker may be adjusted in amplitude, periodicity, etc.

Block 60 may track a frequency of use for a personal care composition based on each time the personal care composition is detected, based on a frequency of application, based on a frequency of reapplication, coverage area, or combinations thereof. Block 60 may compare the tracked use against historical data for the user or a set of users, compare the tracked use against product metadata, utilize prompts or sensors with the tracked use, refer to a user preference, etc., to provide guidance to a user for application or reapplication, replenishment services to a user, and/or product recommendations to a user.

While independent blocks and/or a particular order has been shown for illustration purposes, it should be understood that one or more of the blocks of the method 50 may be combined, omitted, bypassed, re-arranged, and/or flow in any order. Moreover, any or all blocks of the method 50 may be automatically implemented.

Embodiments are applicable for use with all types of semiconductor integrated circuit ("IC") chips. Examples of these IC chips include but are not limited to processors, controllers, chipset components, PLAs, memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A system to detect a sunscreen care composition comprising:
   an image capture device to capture values for infrared (IR) radiation from an interaction between light and an ingredient of a sunscreen composition, wherein the image capture device includes an emitter to emit IR radiation having a first IR pattern, and wherein the image capture device is to capture reflected IR radiation having a second IR pattern that is different from the first IR pattern; and
   a processor including detector logic to detect the presence of the sunscreen composition based only on the values for the IR radiation.

2. The system of claim 1, wherein the emitter emits a grid of emitted IR dots as the first IR pattern, and wherein the image capture device captures a grid of reflected IR dots as the second pattern.

3. The system of claim 1, wherein the detector logic is to establish the presence of the sunscreen composition based on one or more of pixel values, voxel values, or normalized values corresponding to reflected IR radiation.

4. The system of claim 1, wherein the processor further includes identifier logic to identify the sunscreen composition.

5. The system of claim 4, wherein the identifier logic is to access a data storage device having values for reference IR radiation, product metadata, sensor data, user preference data, tracked use data, historical data, application use data, user prompt data, context data, or combinations thereof.

6. The system of claim 1, wherein the processor further includes refence logic to capture values for reference IR radiation.

7. The system of claim 6, wherein the reference logic is to map the values for the reference IR radiation to specific ingredients, combinations of ingredients, types of ingredients, combinations of types of ingredients, concentrations of ingredients, ingredient functionality, formulation functionality, formulation formats, specific products, or combinations thereof.

8. The system of claim 1, wherein the reference logic is to determine product metadata including an identification of an active ingredient, an inactive ingredient, a brand, a product name, a marketing claim, a product identifier, a trademark, ingredient functionality, formulation functionality, or combinations thereof.

9. The system of claim 8, wherein the reference logic is to determine the product metadata by implementing object recognition processes, by using an identifier associated with the product, or combinations thereof.

10. The system of claim 8, wherein the reference logic is to determine the product metadata from publicly available information, non-public information, or combinations thereof, wherein publicly available information includes information from a web page, a product label, a packaging component, or combinations thereof, and wherein the non-public information includes information from a formulation listing having an exact ingredient used, an exact concentration of the exact ingredient used, an exact formulation format of the sunscreen composition, an exact functionality of the exact ingredient used, a formulation functionality, or combinations thereof.

11. The system of claim 1, wherein the processor further includes feedback logic to provide output to a user based on a detection of the sunscreen composition.

12. The system of claim 11, wherein the output is to be further based on an identification of the sunscreen composition, product metadata, sensor data, user preference data, tracked use data, historical data, application use data, user prompt data, context data, or combinations thereof.

13. The system of claim 11, wherein the feedback logic is to determine a region of interest in a scene captured by the image capture device.

14. The system of claim 11, wherein the output includes a visual message to a user, an audio message to the user, a tactile message to the user, or combinations thereof.

15. The system of claim 11, wherein the output includes a message corresponding to a determination of whether a sufficient or desired coverage is achieved for sunscreen composition, an identification of the sunscreen composition, guidance for application or reapplication of the sunscreen composition, replenishment services, product recommendations, or combinations thereof.

16. The system of claim 1, wherein the image capture device is to be physically located on a same computing device with the processor, and wherein the computing device is to include a smart device; comprising a smartphone, a smart television, augmented reality (AR) glasses, virtual reality (VR) glasses, or combinations thereof.

17. The system of claim 1, wherein the sunscreen composition is to include an ingredient selected based on an ability to exhibit diffuse reflection independent at least of formulation functionality.

18. The system of claim 17, wherein the ingredient includes a metal particle, a synthetic particle, a mineral particle, or combinations thereof, and wherein the sunscreen composition further includes an active agent selected from an organic sunscreen filter, an antioxidant, a skin care ingredient, an insect repellent, or combinations thereof.

19. At least one computer readable storage medium comprising a set of instructions, which when executed by a processor, cause the processor to:

capture values for infrared (IR) radiation from an interaction between light and an ingredient of a sunscreen composition, wherein an emitter is to emit IR radiation having a first IR pattern, and wherein an image capture device is to capture reflected IR radiation having a second IR pattern that is different from the first IR pattern; and detect the presence of the sunscreen composition based only on the values for the IR radiation.

20. A method to detect a sunscreen composition comprising:

capturing values for infrared (IR) radiation from an interaction between light and an ingredient of a sunscreen composition, wherein an emitter is to emit IR radiation having a first IR pattern, and wherein an image capture device is to capture reflected IR radiation having a second IR pattern that is different from the first IR pattern; and detecting the presence of the sunscreen composition based only on the values for IR radiation.

* * * * *